United States Patent
Zhao et al.

(10) Patent No.: US 12,088,792 B2
(45) Date of Patent: *Sep. 10, 2024

(54) METHOD AND APPARATUS FOR FURTHER IMPROVED CONTEXT DESIGN FOR PREDICTION MODE AND CODED BLOCK FLAG (CBF)

(71) Applicant: TENCENT AMERICA LLC, Palo Alto, CA (US)

(72) Inventors: Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/975,850

(22) Filed: Oct. 28, 2022

(65) Prior Publication Data

US 2023/0068825 A1     Mar. 2, 2023

Related U.S. Application Data

(63) Continuation of application No. 17/363,910, filed on Jun. 30, 2021, now Pat. No. 11,533,473, which is a
(Continued)

(51) Int. Cl.
*H04N 19/105* (2014.01)
*H04N 19/13* (2014.01)
(Continued)

(52) U.S. Cl.
CPC .......... *H04N 19/105* (2014.11); *H04N 19/13* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS 10,027,976 B2    7/2018    Schwarz et al.
10,547,847 B2    1/2020    Jang et al.
(Continued)

FOREIGN PATENT DOCUMENTS

EP     2733941 A1     5/2014
JP     2013542691 A   11/2013
(Continued)

OTHER PUBLICATIONS

Benjamin Bross et al., "Versatile Video Coding (Draft 3)", Joint Video Experts Team (JVET) of ITU-T SG 16 WP 3 and ISO/IEC JTC 1/SC 29/WG 11, JVET-L1001-v9, Oct. 3-12, 2018, 235 pages.
(Continued)

*Primary Examiner* — Rebecca A Volentine
(74) *Attorney, Agent, or Firm* — Sughrue Mion, PLLC

(57) ABSTRACT

A method of controlling intra-inter prediction for decoding or encoding of a video sequence, is performed by at least one processor. The method includes determining whether one or more neighboring blocks in a video sequence is coded by an intra prediction mode, coding a prediction mode flag of a current block by a first context based on determining that at least one of the neighboring blocks is coded by the intra prediction mode, and coding the prediction mode flag of the current block by a second context based on determining that none of the neighboring blocks are coded by at least the intra prediction mode.

20 Claims, 12 Drawing Sheets

Related U.S. Application Data continuation of application No. 16/393,439, filed on Apr. 24, 2019, now Pat. No. 11,115,652.

(60) Provisional application No. 62/777,041, filed on Dec. 7, 2018.

(51) Int. Cl.
    *H04N 19/159*     (2014.01)
    *H04N 19/176*     (2014.01)
    *H04N 19/46*     (2014.01)

(56) References Cited

U.S. PATENT DOCUMENTS

| | | |
|---|---|---|
| 2010/0195715 A1 | 8/2010 | Liu et al. |
| 2010/0239002 A1 | 9/2010 | Park et al. |
| 2013/0034153 A1 | 2/2013 | Song et al. |
| 2013/0034167 A1 | 2/2013 | Zheng |
| 2013/0329784 A1 | 12/2013 | Chuang et al. |
| 2016/0065964 A1 | 3/2016 | Zhang et al. |
| 2017/0251213 A1 | 8/2017 | Ye et al. |
| 2017/0332095 A1 | 11/2017 | Zou et al. |
| 2018/0249156 A1 | 8/2018 | Heo et al. |
| 2018/0332288 A1 | 11/2018 | Hsiang et al. |
| 2020/0068218 A1 | 2/2020 | Chen et al. |

FOREIGN PATENT DOCUMENTS

| | | |
|---|---|---|
| JP | 5658033 B2 | 1/2015 |
| KR | 1020180041211 A | 4/2018 |
| WO | 2015054811 A1 | 4/2015 |
| WO | 2017052009 A1 | 3/2017 |
| WO | 2017/088810 A1 | 6/2017 |
| WO | 2018135885 A1 | 7/2018 |

OTHER PUBLICATIONS

Extended European Search Report issued Dec. 23, 2021 in European Application No. 19891775.9.

High efficiency video coding, Recommendation ITU-T, Telecommunication Standardization Sector of ITU, H.265, Dec. 2016, 664 pages.

International Search Report and Written Opinion dated Feb. 12, 2020 from the International Bureau in application No. PCT/US2019/063516.

Man-Shu Chiang et al., "CE10.1.1: Multi-hypothesis prediction for improving AMVP mode, skip or merge mode, and intra mode", Joint Video Experts Team (JVET), of ITU-T SG 16 WP 3 and ISO/IEC JTC 1/SC 29/WG 11, JVET-L0100-v3, Oct. 3-12, 2018, 14 pages.

Notice of Reasons for Refusal dated Nov. 30, 2021 from the Japanese Patent Office in Japanese Application No. 2020-557988.

Ximin Zhang et al., "Intra mode coding with fixed length binarization", Joint Collaborative Team on Video Coding (JCT-VC) of ITU-T SG16 WP3 and ISO/IEC JTC1/SC29/WG11, JCTVC-H0435, Nov. 21-30, 2011, 5 pages.

Xin Zhao et al., "CE4-related: Improved context for prediction mode flag", Joint Video Experts Team (JVET), of ITU-T SG 16 WP 3 and ISO/IEC JTC 1/SC 29/WG 11, JVET-M0502, 13th Meeting, Marrakech, MA, Jan. 9-18, 2019, pp. 1-3 (3 pages total).

METHOD AND APPARATUS FOR FURTHER IMPROVED CONTEXT DESIGN FOR PREDICTION MODE AND CODED BLOCK FLAG (CBF)

CROSS-REFERENCE TO RELATED APPLICATION

This application is a continuation of U.S. application Ser. No. 17/363,910, filed on Jun. 30, 2021, which is a continuation of U.S. application Ser. No. 16/393,439, filed on Apr. 24, 2019, now U.S. Pat. No. 11,115,652, issued on Sep. 7, 2021, which claims priority from U.S. Provisional Patent Application No. 62/777,041, filed on Dec. 7, 2018, in the United States Patent and Trademark Office, the disclosures of which are incorporated herein by reference in their entireties.

BACKGROUND

1. Field

Methods and apparatuses consistent with embodiments relate to video coding, and more particularly, a method and an apparatus for an improved context design for a prediction mode and a coded block flag (CBF).

2. Description of Related Art

Intra prediction modes used in High Efficiency Video Coding (HEVC) are illustrated in FIG. 1A. In HEVC, there are a total 35 intra prediction modes, among which mode 10 (101) is a horizontal mode, mode 26 (102) is a vertical mode, and mode 2 (103), mode 18 (104) and mode 34 (105) are diagonal modes. The intra prediction modes are signaled by three most probable modes (MPMs) and 32 remaining modes.

Regarding Versatile Video Coding (VVC), a partial coding unit syntax table is shown below. A flag pred_mode_flag is signaled in a case in which a slice type is not intra and a skip mode is not selected, and only one context (e.g., variable pred_mode_flag) is used for coding this flag. The partial coding unit syntax table is as follows:

7.3.4.5 Coding Unit Syntax

|  | Descriptor |
| --- | --- |
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] == 0 ) | |
|       pred_mode_flag | ae(v) |
| } | |

-continued

|  | Descriptor |
| --- | --- |
| if( CuPredMode[ x0 ][ y0 ] == MODE_INTRA ) { | |
|   ...... | |

Referring to FIG. 1B, in VVC, there are a total 87 intra prediction modes, among which mode 18 (106) is a horizontal mode, mode 50 (107) is a vertical mode, and mode 2 (108), mode 34 (109) and mode 66 (110) are diagonal modes. Modes −1 to −10 (111) and Modes 67 to 76 (112) are called Wide-Angle Intra Prediction (WAIP) modes.

For a chroma component of an intra coded block, an encoder selects best chroma prediction modes among five modes, including a planar mode (mode index 0), a DC mode (mode index 1), a horizontal mode (mode index 18), a vertical mode (mode index 50) and a Diagonal mode (mode index 66), and a direct copy of an intra prediction mode for an associated luma component, namely, the DM mode. A mapping between an intra prediction direction and an intra prediction mode number for chroma is shown in Table 1 below:

TABLE 1

Mapping between intra prediction direction and intra prediction mode for chroma

| | IntraPredModeY[xCb + cbWidth/2][yCb + cbHeight/2] | | | | |
| --- | --- | --- | --- | --- | --- |
| intra_chroma_pred_mode[xCb][yCb] | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

To avoid a duplicate mode, the four modes other than the DM mode are assigned according to the intra prediction mode of the associated luma component. When the intra prediction mode number for the chroma component is 4, the intra prediction direction for the luma component is used for intra prediction sample generation for the chroma component. When the intra prediction mode number for the chroma component is not 4 and is identical to the intra prediction mode number for the luma component, an intra prediction direction of 66 is used for the intra prediction sample generation for the chroma component.

Multi-hypothesis intra-inter prediction combines one intra prediction and one merge indexed prediction, namely, an intra-inter prediction mode. In a merge coding unit (CU), one flag is signaled for a merge mode to select an intra mode from an intra candidate list when the flag is true. For a luma component, the intra candidate list is derived from 4 intra prediction modes including DC, planar, horizontal, and vertical modes, and a size of the intra candidate list can be 3 or 4 depending on a block shape. When a CU width is larger than double a CU height, the horizontal mode is removed from the intra candidate list, and when the CU height is larger than double the CU width, the vertical mode is removed from the intra candidate list. One intra prediction mode selected by an intra mode index and one merge indexed prediction selected by a merge index are combined using a weighted average. For a chroma component, DM is always applied without extra signaling.

Weights for combining predictions are described as follows. When a DC or planar mode is selected or a Coding Block (CB) width or height is smaller than 4, equal weights are applied. For those CBs with a CB width or height larger than or equal to 4, when a horizontal/vertical mode is selected, one CB is first vertically/horizontally split into four equal-area regions. Each weight set, denoted as $(w\_intra_i, w\_inter_i)$, where i is from 1 to 4 and $(w\_intra_1, w\_inter_1)=(6, 2)$, $(w\_intra_2, w\_inter_2)=(5, 3)$, $(w\_intra_3, w\_inter_3)=(3, 5)$, and $(w\_intra_4, w\_inter_4)=(2, 6)$, will be applied to a corresponding region. $(w\_intra_1, w\_inter_1)$ is for a region closest to reference samples, and $(w\_intra_4, w\_inter_4)$ is for a region farthest away from the reference samples. Then, a combined prediction can be calculated by summing up two weighted predictions and right-shifting 3 bits. Moreover, an intra prediction mode for an intra hypothesis of predictors can be saved for an intra mode coding of following neighboring CBs if they are intra coded.

SUMMARY

According to embodiments, there is a method for video coding, decoding or encoding, comprising determining whether at least one of a plurality of neighboring blocks in a video sequence is coded by an intra prediction mode, entropy coding a prediction mode flag of a current block by a first context in response to determining that at least one of the plurality of neighboring blocks is coded by the intra prediction mode, and entropy coding the prediction mode flag of the current block by a second context in response to determining that none of the plurality of neighboring blocks are coded by at least the intra prediction mode.

According to embodiments, there is an apparatus for video coding, decoding or encoding, the apparatus comprising at least one memory configured to store computer program code, and at least one processor configured to access the at least one memory and operate according to the computer program code. The computer program code comprising first determining code configured to cause the at least one processor to determine whether at least one of a plurality of neighboring blocks in a video sequence is coded by an intra prediction mode, performing code configured to cause the at least one processor to entropy code a prediction mode flag of a current block by a first context in response to determining that at least one of the plurality of neighboring blocks is coded by the intra prediction mode, and second performing code configured to cause the at least one processor to entropy code the prediction mode flag of the current block by a second context in response to determining that none of the plurality of neighboring blocks are coded by at least the intra prediction mode.

According to embodiments, there is a non-transitory computer-readable storage medium storing instructions that cause at least one processor to determine whether at least one of a plurality of neighboring blocks in a video sequence is coded by an intra prediction mode, entropy code a prediction mode flag of a current block by a first context in response to determining that at least one of the plurality of neighboring blocks is coded by the intra prediction mode, and entropy code the prediction mode flag of the current block by a second context in response to determining that none of the plurality of neighboring blocks are coded by at least the intra prediction mode.

According to embodiments, there is entropy coding the prediction mode flag of the current block comprises coding by only the first context and the second context.

According to embodiments, there is determining whether at least one of the plurality of neighboring blocks is coded by an intra-inter prediction mode, entropy coding the prediction mode flag of the current block by the first context in response to determining that at least one of the plurality of neighboring blocks is coded by the intra-inter prediction mode, and entropy coding the prediction mode flag of the current block by the second context in response to determining that none of the plurality of neighboring blocks are coded by any of the intra prediction mode and the intra-inter prediction mode.

According to embodiments, there is entropy coding a skip flag of the current block by a first skip context in response to determining that at least one of the plurality of neighboring blocks is coded by the intra prediction mode, and entropy coding the skip flag of the current block by a second skip context in response to determining that none of the plurality of neighboring blocks are coded by at least the intra prediction mode.

According to embodiments, there is entropy coding an affine flag of the current block by a first affine context in response to determining that at least one of the plurality of neighboring blocks is coded by the intra prediction mode, and entropy coding the affine flag of the current block by a second affine context in response to determining that none of the plurality of neighboring blocks are coded by at least the intra prediction mode.

According to embodiments, there is entropy coding a sub-block merge flag of the current block by a first sub-block merge context in response to determining that at least one of the plurality of neighboring blocks is coded by the intra prediction mode, and entropy coding the sub-block merge flag of the current block by a second sub-block merge context in response to determining that none of the plurality of neighboring blocks are coded by at least the intra prediction mode.

According to embodiments, there is entropy coding a coding unit (CU) split flag of the current block by a first CU split context in response to determining that at least one of the plurality of neighboring blocks is coded by the intra prediction mode, and entropy coding the CU split flag of the current block by a second CU split context in response to determining that none of the plurality of neighboring blocks are coded by at least the intra prediction mode.

According to embodiments, there is entropy coding an adaptive motion vector resolution (AMVR) flag of the current block by a first AMVR context in response to determining that at least one of the plurality of neighboring blocks is coded by the intra prediction mode, and entropy coding the AMVR flag of the current block by a second AMVR context in response to determining that none of the plurality of neighboring blocks are coded by at least the intra prediction mode.

According to embodiments, there is entropy coding an intra-inter mode flag of the current block by a first intra-inter mode context in response to determining that at least one of the plurality of neighboring blocks is coded by the intra prediction mode, and entropy coding the intra-inter mode flag of the current block by a second intra-inter mode context in response to determining that none of the plurality of neighboring blocks are coded by at least the intra prediction mode.

According to embodiments, there is entropy coding a triangle partitioning mode flag of the current block by a first triangle partitioning mode context in response to determining that at least one of the plurality of neighboring blocks is coded by the intra prediction mode, and entropy coding the triangle partitioning mode flag of the current block by a second triangle partitioning mode context in response to determining that none of the plurality of neighboring blocks are coded by at least the intra prediction mode.

According to embodiments, there is entropy coding a coded block flag (CBF) of the current block by a first CBF context in response to determining that at least one of the plurality of neighboring blocks is coded by the intra prediction mode, and entropy coding the CBF of the current block by a second CBF context in response to determining that none of the plurality of neighboring blocks are coded by at least the intra prediction mode.

DETAILED DESCRIPTION

Figure 1A:
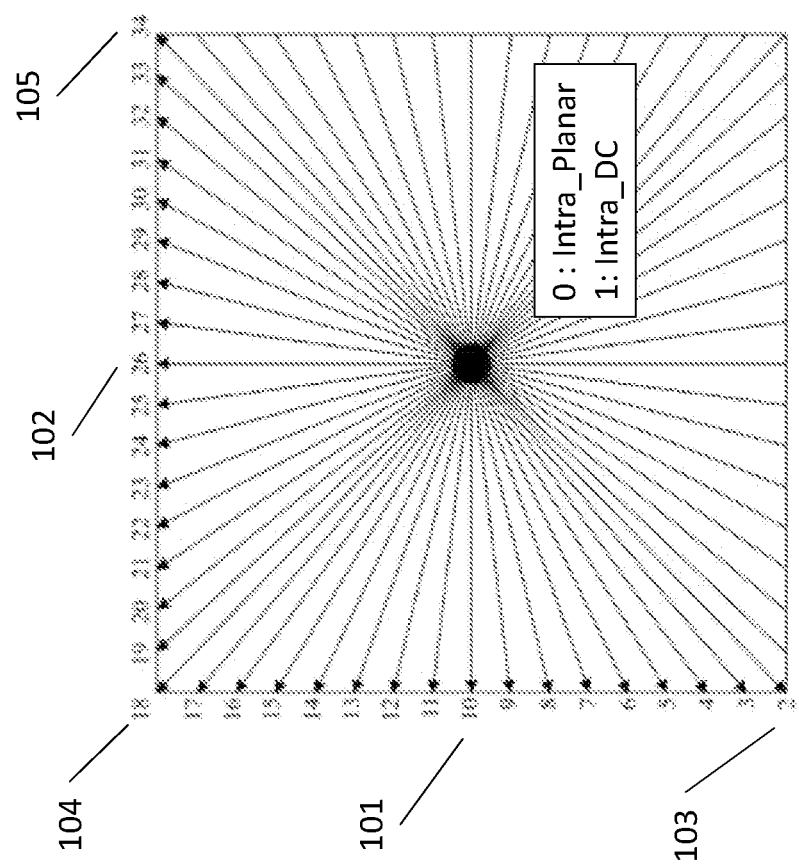
FIG. 1A is a diagram of intra prediction modes in HEVC.
Figure 1B:
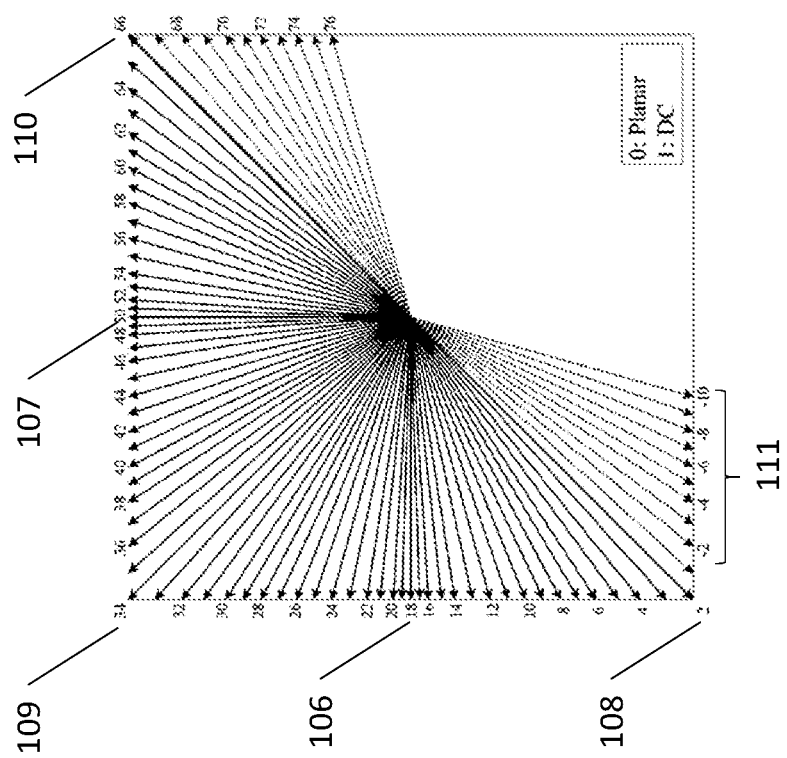
FIG. 1B is a diagram of intra prediction modes in VVC.
Figure 2:
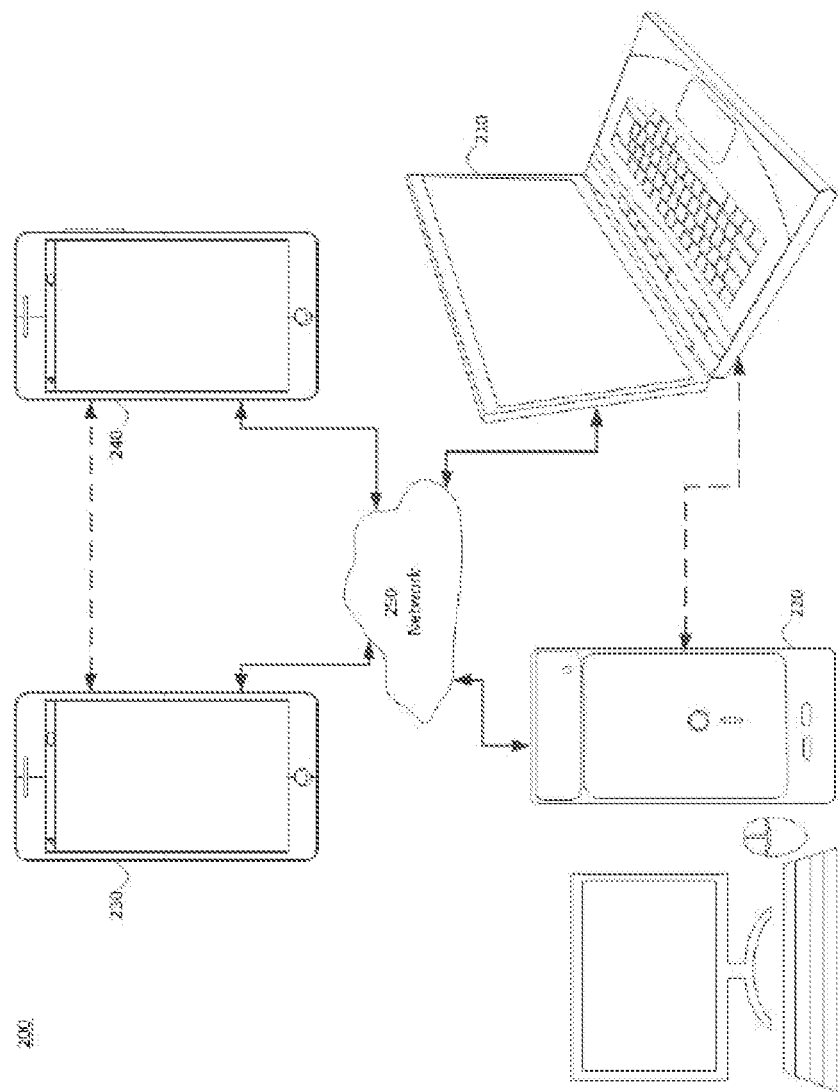
FIG. 2 is a simplified block diagram of a communication system according to an embodiment.

FIG. 2 is a simplified block diagram of a communication system (200) according to an embodiment. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
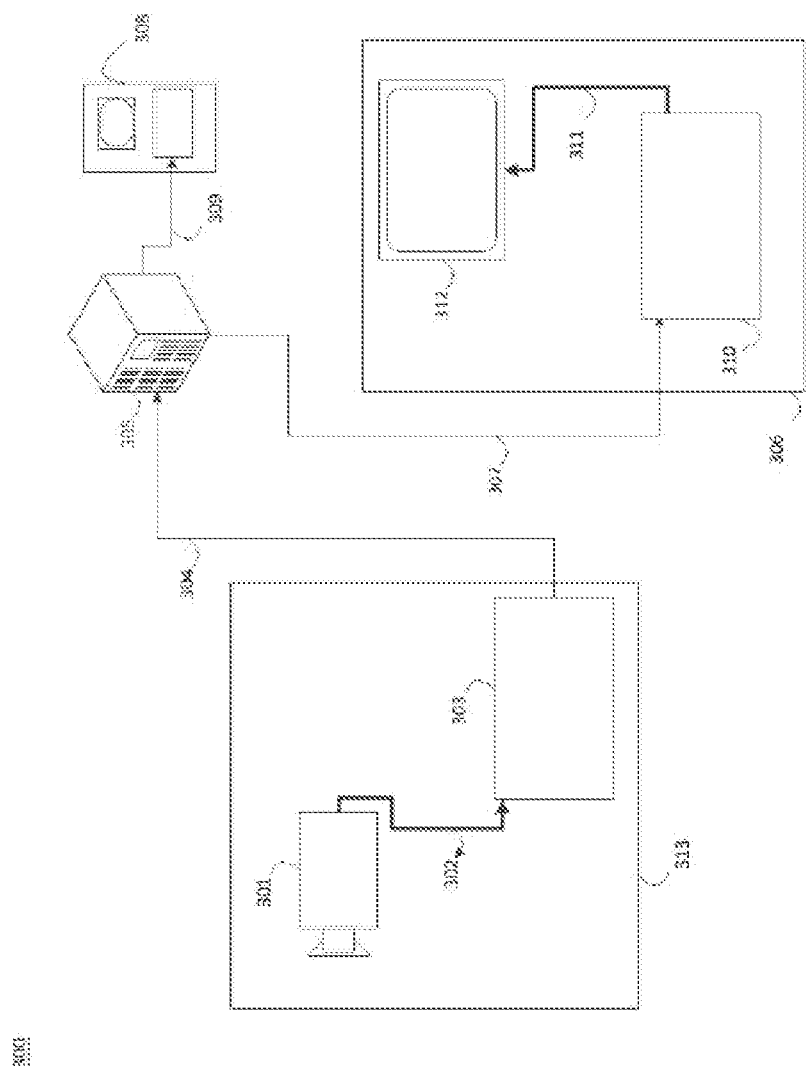
FIG. 3 is a diagram of a placement of a video encoder and a video decoder in a streaming environment, according to an embodiment.

FIG. 3 is a diagram of a placement of a video encoder and a video decoder in a streaming environment (300), according to an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard, VVC. The disclosed subject matter may be used in the context of VVC.

Figure 4:
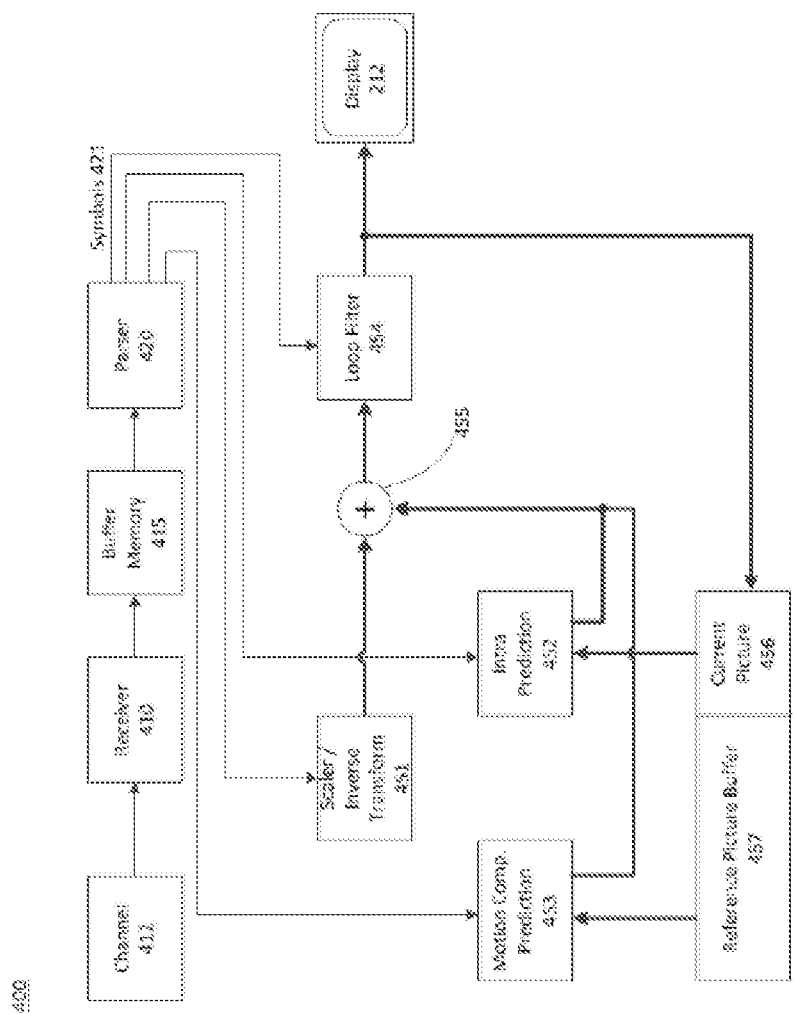
FIG. 4 is a functional block diagram of a video decoder according to an embodiment.

FIG. 4 is a functional block diagram (400) of a video decoder (310) according to an embodiment.

A receiver (410) may receive one or more codec video sequences to be decoded by the decoder (310); in the same or an embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, CUs, blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
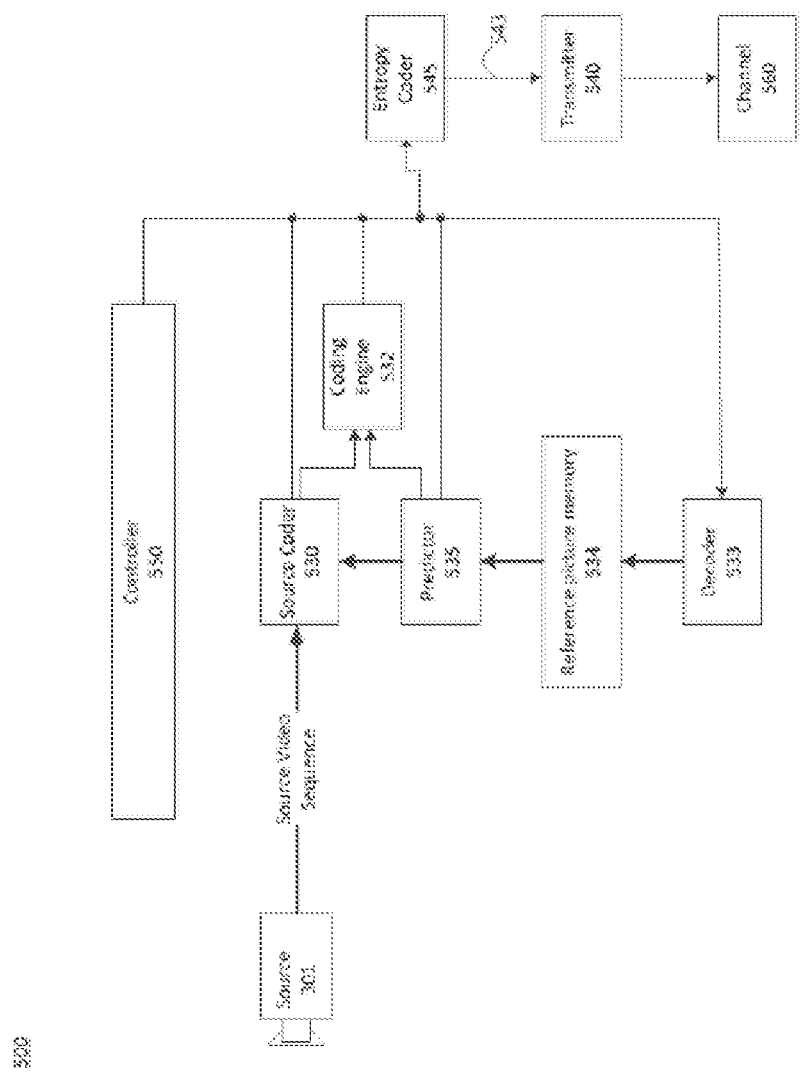
FIG. 5 is a functional block diagram of a video encoder according to an embodiment.

FIG. 5 is a functional block diagram (500) of a video encoder (303) according to an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can include the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and encoding/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In the related art, for coding a flag pred_mode_flag indicating whether a block is intra or inter coded, only one context is used, and values of flags applied on neighboring blocks are not used. Further, when a neighboring block is coded by an intra-inter prediction mode, it is predicted using a mixture of intra and inter prediction modes, and therefore, it may be more efficient to consider whether a neighboring block is coded using an intra-inter prediction mode for a context design of signaling the flag pred_mode_flag.

Embodiments described herein may be used separately or combined in any order. In the following text, a flag pred_mode_flag indicating whether a current block is intra or inter coded.

Figure 6:
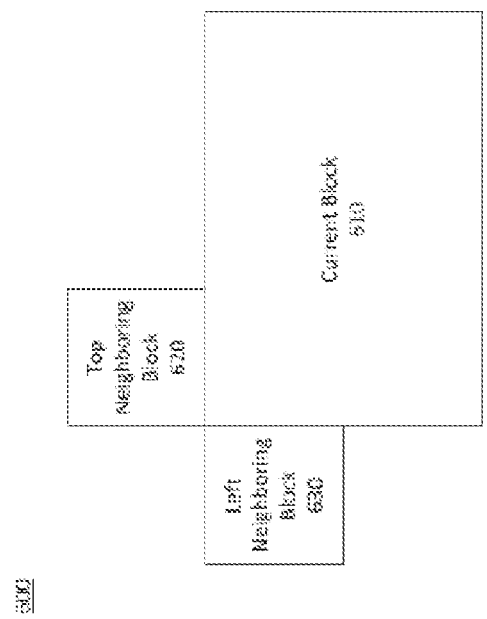
FIG. 6 is a diagram of a current block and neighboring blocks of the current block, according to embodiments.

FIG. 6 is a diagram (600) of a current block and neighboring blocks of the current block, according to embodiments.

Referring to FIG. 6, a current block (610) is shown along with a top neighboring block (620) and a left neighboring block (630) of the current block (610). Each of the top neighboring block (620) and the left neighboring block (630) may have a width of 4 and a height of 4.

In embodiments, information of whether neighboring blocks (e.g., the top neighboring block (620) and the left neighboring block (630)) are coded by an intra prediction mode, an inter prediction mode, or an intra-inter prediction mode is used for deriving a context value used for entropy coding a flag pred_mode_flag of a current block (e.g., the current block (610)). In detail, when a neighboring block is coded by an intra-inter prediction mode, an associated intra prediction mode is used for intra mode coding and/or MPM derivation of the current block, but the neighboring block is considered as an inter-coded block when deriving the context value for entropy coding the flag pred_mode_flag of the current block although intra prediction is used for the neighboring block.

In an example, the associated intra prediction mode of an intra-inter prediction mode is always planar.

In another example, the associated intra prediction mode of an intra-inter prediction mode is always DC.

In still another example, the associated intra prediction mode is aligned with an intra prediction mode applied in the intra-inter prediction mode.

In embodiments, when a neighboring block (e.g., the top neighboring block (620) and the left neighboring block (630)) is coded by an intra-inter prediction mode, an associated intra prediction mode is used for the intra mode coding and/or MPM derivation of a current block (e.g., the current block (610)), but the neighboring block is also considered as an intra-coded block when deriving a context value for entropy coding a flag pred_mode_flag of the current block.

In an example, the associated intra prediction mode of an intra-inter prediction mode is always planar.

In another example, the associated intra prediction mode of an intra-inter prediction mode is always DC.

In still another example, the associated intra prediction mode is aligned with an intra prediction mode applied in the intra-inter prediction mode.

In an embodiment, a context index or value is incremented by 2, 0 and 1 when a neighboring block is coded by an intra prediction mode, an inter prediction mode and an inter-intra prediction mode, respectively.

In another embodiment, the context index or value is incremented by 1, 0 and 0.5 when a neighboring block is coded by an intra prediction mode, an inter prediction mode and an inter-intra prediction mode, respectively, and the final context index is rounded to a nearest integer.

After the context index or value is incremented with respect to all of neighboring blocks of the current block and the final context index is determined, an average context index may be determined based on the determined final context index divided by a number of neighboring blocks and rounded to a nearest integer. The flag pred_mode_flag may be set to indicate that the current block is either intra coded or inter coded, based on the determined average context index. For example, if the determined average context index is 1, the flag pred_mode_flag may be set to indicate that the current block is intra coded, and if the determined average context index is 0, the flag pred_mode_flag may be set to indicate that the current block is inter coded.

In embodiments, information of whether a current block (e.g., the current block (610)) is coded by an intra prediction mode, an inter prediction mode or an inter-intra prediction mode is used for deriving one or more context values for entropy coding a CBF of the current block.

In an embodiment, three separate contexts (e.g., variables) are used for entropy coding the CBF: one is used when the current block is coded by an intra prediction mode, one is used when the current block is coded by an inter prediction mode, and one is used when the current block is coded by an intra-inter prediction mode. The three separate contexts may be applied only for coding luma CBF, only for coding chroma CBF or only for coding both luma and chroma CBF.

In another embodiment, two separate contexts (e.g., variables) are used for entropy coding the CBF: one is used when the current block is coded by an intra prediction mode, and one is used when the current block is coded by an inter prediction mode or an intra-inter prediction mode. The two separate contexts may be applied only for coding luma CBF, only for coding chroma CBF or only for coding both luma and chroma CBF.

In still another embodiment, two separate contexts (e.g., variables) are used for entropy coding the CBF: one is used when the current block is coded by an intra prediction mode or an intra-inter prediction mode, and one is used when the current block is coded by an inter prediction mode. The two separate contexts may be applied only for coding luma CBF, only for coding chroma CBF or only for coding both luma and chroma CBF.

Figure 7:
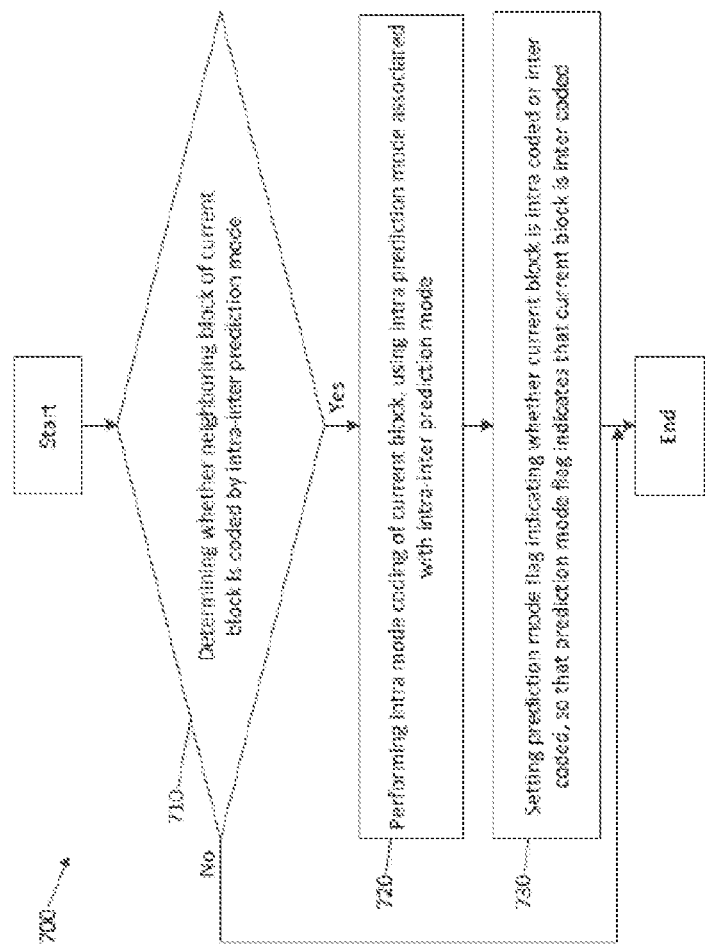
FIG. 7 is a flowchart illustrating a method of controlling intra-inter prediction for decoding or encoding of a video sequence, according to an embodiment.

FIG. 7 is a flowchart illustrating a method (700) of controlling intra-inter prediction for decoding or encoding of a video sequence, according to an embodiment. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes determining whether a neighboring block of a current block is coded by an intra-inter prediction mode. Based on the neighboring block being determined to not be coded by the intra-inter prediction mode (710—No), the method (700) ends.

Based on the neighboring block being determined to be coded by the intra-inter prediction mode (710—Yes), in a second block (720), the method (700) includes performing intra mode coding of the current block, using an intra prediction mode associated with the intra-inter prediction mode.

In a third block (730), the method (700) includes setting a prediction mode flag indicating whether the current block is intra coded or inter coded, so that the prediction mode flag indicates that the current block is inter coded.

The method (700) may further include, based on the neighboring block being determined to be coded by the intra-inter prediction mode (710—Yes), performing MPM derivation of the current block, using the intra prediction mode associated with the intra-inter prediction mode.

The intra prediction mode associated with the intra-inter prediction mode may be a planar mode, a DC mode, or an intra prediction mode that is applied in the intra-inter prediction mode.

The method (700) may further include determining whether the neighboring block is coded by an intra prediction mode, an inter prediction mode, or an intra-inter prediction mode, based on the neighboring block being determined to be coded by the intra prediction mode, incrementing a context index of the prediction mode flag by 2, based on the neighboring block being determined to be coded by the inter prediction mode, incrementing the context index by 0, based on the neighboring block being determined to be coded by the intra-inter prediction mode, incrementing the context index by 1, determining an average context index, based on the incremented context index and a number of neighboring blocks of the current block, and setting the prediction mode flag, based on the determined average context index.

The method may further include determining whether the neighboring block is coded by an intra prediction mode, an inter prediction mode, or an intra-inter prediction mode, based on the neighboring block being determined to be coded by the intra prediction mode, incrementing a context index of the prediction mode flag by 2, based on the neighboring block being determined to be coded by the inter prediction mode, incrementing the context index by 0, based on the neighboring block being determined to be coded by the intra-inter prediction mode, incrementing the context index by 1, determining an average context index, based on the incremented context index and a number of neighboring blocks of the current block, and setting the prediction mode flag, based on the determined average context index.

Although FIG. 7 shows example blocks of the method (700), in some implementations, the method (700) may include additional blocks, fewer blocks, different blocks, or differently arranged blocks than those depicted in FIG. 7. Additionally, or alternatively, two or more of the blocks of the method (700) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 8:
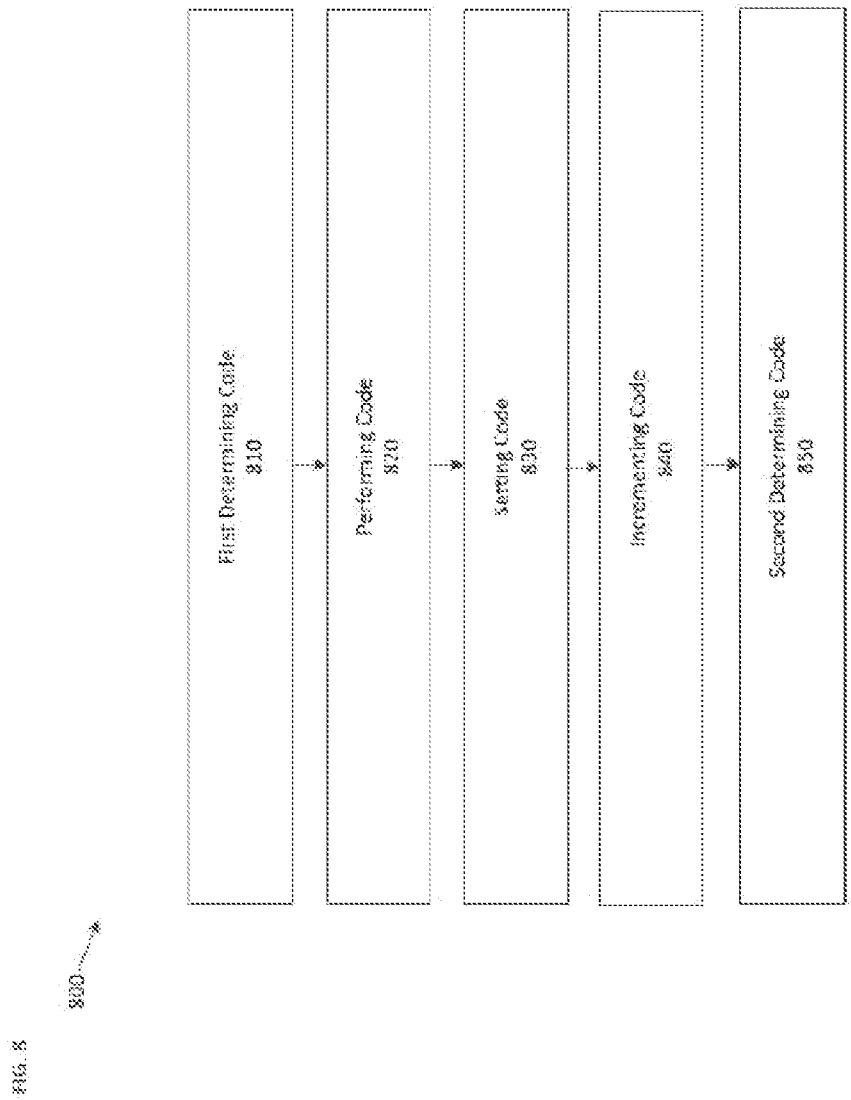
FIG. 8 is a simplified block diagram of an apparatus for controlling intra-inter prediction for decoding or encoding of a video sequence, according to an embodiment.

FIG. 8 is a simplified block diagram of an apparatus (800) for controlling intra-inter prediction for decoding or encoding of a video sequence, according to an embodiment.

Referring to FIG. 8, the apparatus (800) includes first determining code (810), performing code (820) and setting code (830). The apparatus (800) may further include incrementing code (840) and second determining code (850).

The first determining code (810) is configured to cause at least one processor to determine whether a neighboring block of a current block is coded by an intra-inter prediction mode.

The performing code (820) is configured to cause the at least one processor to, based on the neighboring block being determined to be coded by the intra-inter prediction mode, perform intra mode coding of the current block, using an intra prediction mode associated with the intra-inter prediction mode.

The setting code (830) is configured to cause the at least one processor to, based on the neighboring block being determined to be coded by the intra-inter prediction mode, set a prediction mode flag indicating whether the current block is intra coded or inter coded, so that the prediction mode flag indicates that the current block is inter coded.

The performing code (820) may be further configured to cause the at least one processor to, based on the neighboring block being determined to be coded by the intra-inter prediction mode, perform Most Probable Mode (MPM) derivation of the current block, using the intra prediction mode associated with the intra-inter prediction mode.

The intra prediction mode associated with the intra-inter prediction mode may be a planar mode, a DC mode, or an intra prediction mode that is applied in the intra-inter prediction mode.

The first determining code (810) may be further configured to cause the at least one processor to determine whether the neighboring block is coded by an intra prediction mode, an inter prediction mode, or an intra-inter prediction mode. The incrementing code (840) may be configured to cause the at least one processor to, based on the neighboring block being determined to be coded by the intra prediction mode, increment a context index of the prediction mode flag by 2, based on the neighboring block being determined to be coded by the inter prediction mode, increment the context index by 0, and based on the neighboring block being determined to be coded by the intra-inter prediction mode, increment the context index by 1. The second determining code (850) may be configured to cause the at least one processor to determine an average context index, based on the incremented context index and a number of neighboring blocks of the current block. The setting code (830) may be further configured to cause the at least one processor to set the prediction mode flag, based on the determined average context index.

The first determining code (810) may be further configured to cause the at least one processor to determine whether the neighboring block is coded by an intra prediction mode, an inter prediction mode, or an intra-inter prediction mode. The incrementing code (840) may be configured to cause the at least one processor to, based on the neighboring block being determined to be coded by the intra prediction mode, increment a context index of the prediction mode flag by 1, based on the neighboring block being determined to be coded by the inter prediction mode, increment the context index by 0, and based on the neighboring block being determined to be coded by the intra-inter prediction mode, increment the context index by 0.5. The second determining code (850) may be configured to cause the at least one processor to determine an average context index, based on the incremented context index and a number of neighboring blocks of the current block. The setting code (830) may be further configured to cause the at least one processor to set the prediction mode flag, based on the determined average context index.

The techniques described above, can be implemented as computer software using computer-readable instructions and physically stored in one or more computer-readable media.

Figure 9:
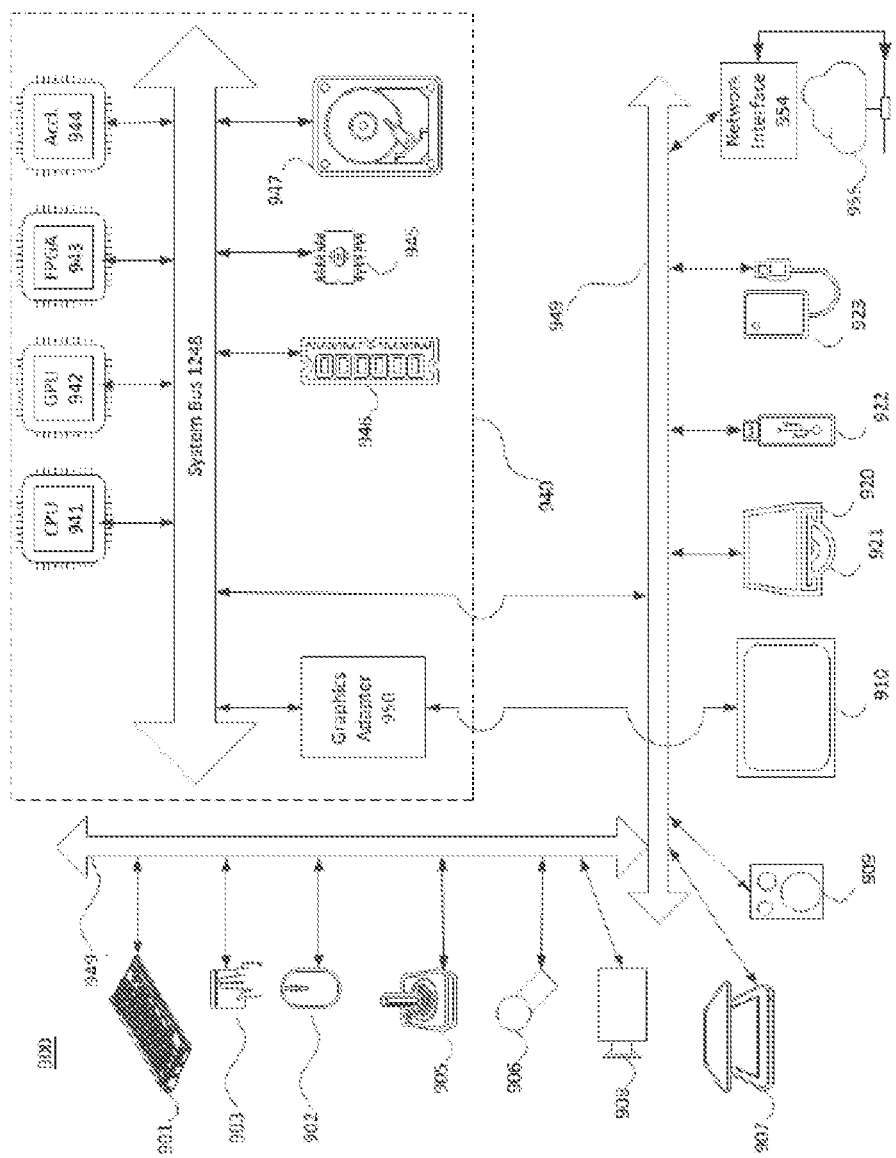
FIG. 9 is a diagram of a computer system suitable for implementing embodiments.

FIG. 9 is a diagram of a computer system (900) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are exemplary in nature and are not intended to suggest any limitation as to the scope of use or functionality of the computer software implementing embodiments. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (904), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (904), or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

The inventors have observed that pred_mode_flag has some correlation with its neighbors, neighboring blocks, to a current block. In a case that the neighbor(s) use a pred_mode_flag equal to 1, context, then there may be a higher probability that the current block should or is also using a pred_mode_flag equal to 1. In such cases, because of the correlation, improved context efficiency may be achieved in arithmetic coding/decoding. Neighboring block information could be used as a context for entropy coding/decoding a current pred_mode_flag for an improvement in coding efficiencies.

Additionally, in a VVC, there may be an intra-inter prediction mode as a which is a special prediction mode as a mixture of inter prediction and also intra prediction.

So, in a case in which there is a desire to add a neighboring block as a context for entropy coding/decoding of a pred_mode_flag, there may be a problem that if the neighboring block is coded by an intra-inter mode, then there may be a need to decide whether that neighboring block should be considered as an intra- or as an inter-mode for deriving a context, and aspects of the present application relate to designs for context for entropy coding/decoding of a pred_mode_flag in which there could be different designs.

As described above, if there are multiple neighboring blocks to be identified, then three contexts may be used depending on how many neighboring blocks are intra-coded. For example, if there are no neighboring blocks that are intra-coded, then a context index 0 may be used. If there is one neighboring block intra-coded, then a context index 1 may be used, and otherwise, there may be two neighboring blocks intra-coded in which case a context index 2 may be used. As such, there may be three contexts depending on a number of neighboring blocks being coded by intra-coding.

However, additional improvements may be achieved by reducing the number of contexts from three contexts to two contexts. For example, if none of the neighboring blocks are coded by intra-coding, then a first context may be used, and otherwise, if any of neighboring blocks are using intra-coding, then another context may be used. Such designed may be adopted as part of VVC.

Figure 10:
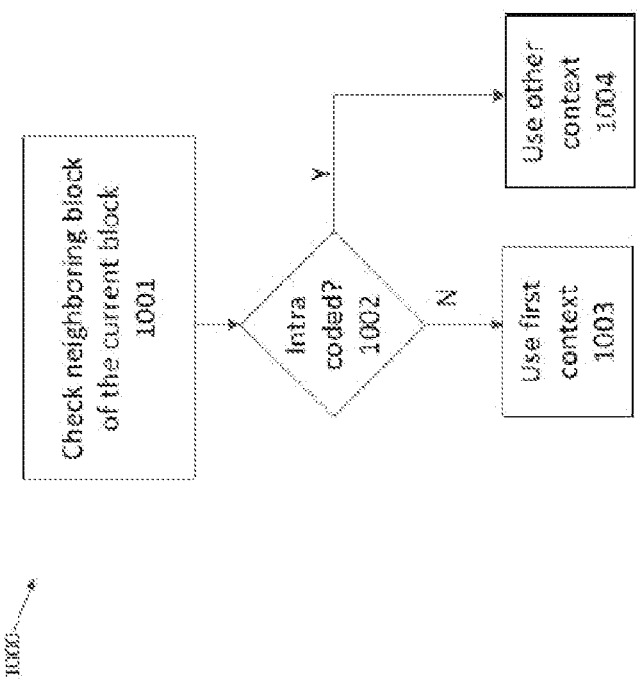
FIG. 10 is a flowchart illustrating a method of controlling decoding or encoding of a video sequence, according to embodiments.

FIG. 10 illustrates an exemplary flowchart (1000) according to embodiments and similar to those described above except for the presently described differences.

At step (1001), there may be a check to determine a neighboring block or blocks to a current block, and at step (1002), it may be determined whether one or more of those neighboring blocks are intra-coded. If not, then at step (1003), a first context may be used for the current block, and if so, then at step (1004) another context may be used for the current block.

According to exemplary embodiments, not only may whether a neighboring block or blocks be checked to determine whether intra-coding is used but also to check if intra-inter coding is used.

Figure 11:
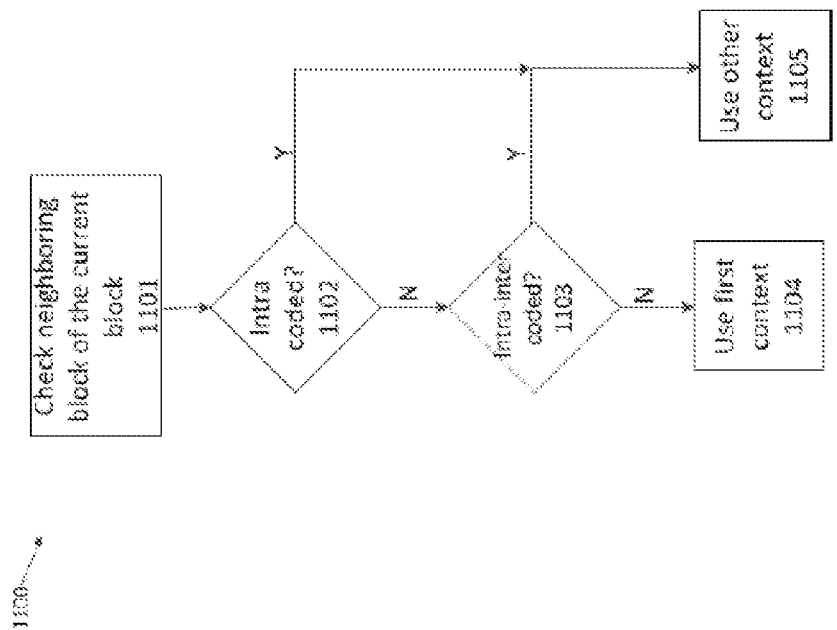
FIG. 11 is a flowchart illustrating a method of controlling decoding or encoding of a video sequence, according to an embodiments.

FIG. 11 illustrates an exemplary flowchart (1100) according to embodiments and similar to those described above except for the presently described differences.

At step (1001), there may be a check to determine a neighboring block or blocks to a current block, and at step (1002), it may be determined whether one or more of those neighboring blocks are intra-coded. If not, then at step (1003), it may be checked whether the neighboring block or blocks is using intra-inter coding, and if so, then at step (1004) a first context may be used for the current block. Otherwise, if either intra-coding is determined at step (1102) or intra-inter coding is determined at step (1103), then another context may be used for the current block at step (1105).

In addition to FIG. 10 and similarly in addition to FIG. 11, although pred_mode_flag has been discussed, further adoption by VVC includes other syntax elements, such as a skip flag, an affine flag, a subblock merge flag as described further with the below syntaxes.

Coding Quadtree Syntax

| | Descriptor |
|---|---|
| coding_quadtree( x0, y0, log2CbSize, cqtDepth, treeType ) { <br>   minQtSize = ( treeType == DUAL_TREE_CHROMA ) ? MinQtSizeC : MinQtSizeY <br>   maxBtSize = ( treeType == DUAL_TREE_CHROMA ) ? MaxBtSizeC : MaxBtSizeY <br>   if( ( ( ( x0 + (1 << log2CbSize ) <= pic_width_in_luma_samples ) ? 1 : 0 ) + <br>     ( ( y0 + ( 1 << log2CbSize ) <= pic_height_in_luma_samples ) ? 1 : 0 ) + <br>     ( ( ( 1 <<log2CbSize ) <= maxBtSize ) ? 1 : 0 ) ) >= 2 && <br>     ( 1 << log2CbSize ) > minQtSize ) <br>     qt_split_cu_flag[ x0 ] [ y0 ] <br>   if( cu_qp_delta_enabled_flag && cqtDepth <= diff_cu_qp_delta_depth ) <br>   { <br>     IsCuQpDeltaCoded = 0 <br>     CuQpDeltaVal = 0 <br>     CuQgTopLeftX = x0 <br>     CuQgTopLeftY = y0 <br>   } <br>   if( qt_split_cu_flag[ x0 ][ y0 ] ) { <br>     x1 = x0 + ( 1 << ( log2CbSize − 1 ) ) <br>     y1 = y0 + ( 1 << ( log2CbSize − 1 ) ) <br>     coding_quadtree( x0, y0, log2CbSize − 1, cqtDepth + 1, treeType ) <br>     if( x1 < pic_width_in_luma_samples ) <br>       coding_quadtree( x1, y0, log2CbSize − 1, cqtDepth + 1, treeType ) <br>     if( y1 < pic_height_in_luma_samples ) <br>       coding_quadtree( x0, y1, log2CbSize − 1, cqtDepth + 1, treeType ) <br>     if( x1 < pic_width_in_luma_samples && y1 < pic_height_in_luma_samples) <br>       coding_quadtree( x1, y1, log2CbSize − 1, cqtDepth + 1, treeType ) <br>   } else <br>     multi_type_tree( x0, y0, 1 << log2CbSize, 1 << log2CbSize, cqtDepth, 0, 0, 0, treeType ) <br> } | <br><br><br><br><br><br><br> ae(v) |

Multi-Type Tree Syntax

| | Descriptor |
|---|---|
| multi_type_tree( x0, y0, cbWidth, cbHeight, cqtDepth, mttDepth, depthOffset, partIdx, treeType ) { <br>   if( ( allowSplitBtVer || allowSplitBtHor || allowSplitTtVer || | |

-continued

| | Descriptor |
|---|---|
| allowSplitTtHor ) && | |
|     ( x0 + cbWidth <= pic_width_in_luma_samples ) && | |
|     (y0 + cbHeight <= pic_height_in_luma_samples ) ) | |
|     mtt_split_cu_flag | ae(v) |
|   if( cu_qp_delta_enabled_flag && | |
| ( cqtDepth + mttDepth ) <= diff_cu_qp_delta_depth ) { | |
|     IsCuQpDeltaCoded = 0 | |
|     CuQpDeltaVal = 0 | |
|     CuQgTopLeftX = x0 | |
|     CuQgTopLeftY = y0 | |
|   } | |
|   if( mtt_split_cu_flag ) { | |
|     if( ( allowSplitBtHor || allowSplitTtHor ) && | |
|       ( allowSplitBtVer || allowSplitTtVer ) ) | |
|     mtt_split_cu_vertical_flag | ae(v) |
|     if( ( allowSplitBtVer && allowSplitTtVer && | |
| mtt_split_cu_vertical_flag)|| | |
|       ( allowSplitBtHor && allowSplitTtHor | |
| && !mtt_split_cu_vertical_flag ) ) | |
|     mtt_split_cu_binary_flag | ae(v) |
|     if( MttSplitMode[ x0 ][ y0 ][ mttDepth ] == SPLIT_BT_VER ) { | |
| depthOffset += (x0 + cbWidth > pic_width_in_luma_samples ) ? 1 : 0 | |
|     x1 = x0 + (cbWidth / 2 ) | |
|     multi_type_tree( x0, y0, cbWidth / 2, cbHeight, | |
|       cqtDepth, mttDepth + 1, depthOffset, 0, treeType ) | |
|     if( x1 < pic_width_in_luma_samples ) | |
|       multi_type_tree( x1, y0, cbWidth / 2, cbHeightY, | |
|       cqtDepth, mttDepth + 1, depthOffset, 1, treeType ) | |
|     } else if( MttSplitMode[ x0 ][ y0 ][ mttDepth ] == SPLIT_BT_HOR ) { | |
| depthOffset += ( y0 + cbHeight > pic_height_in_luma_samples ) ? 1 : 0 | |
|     y1 = y0 + ( cbHeight / 2 ) | |
|     multi_type_tree( x0, y0, cbWidth, cbHeight / 2, | |
|       cqtDepth, mttDepth + 1, depthOffset, 0, treeType ) | |
|     if( y1 < pic_height_in_luma_samples ) | |
|       multi_type_tree( x0, y1, cbWidth, cbHeight / 2, | |
|       cqtDepth, mttDepth + 1, depthOffset, 1, treeType ) | |
|     } else if( MttSplitMode[ x0 ][ y0 ][ mttDepth ] == SPLIT_TT_VER ) { | |
|     x1 = x0 + (cbWidth / 4 ) | |
|     x2 = x0 + ( 3 * cbWidth / 4 ) | |
|     multi_type_tree( x0, y0, cbWidth / 4, cbHeight, | |
|       cqtDepth, mttDepth + 1, depthOffset, 0, treeType ) | |
|     multi_type_tree( x1, y0, cbWidth / 2, cbHeight, | |
|       cqtDepth, mttDepth + 1, depthOffset, 1, treeType ) | |
|     multi_type_tree( x2, y0, cbWidth / 4, cbHeight, | |
|       cqtDepth, mttDepth + 1, depthOffset, 2, treeType ) | |
|     } else { /* SPLIT_TT_HOR */ | |
|     y1 = y0 + ( cbHeight / 4 ) | |
|     y2 = y0 + ( 3 * cbHeight / 4 ) | |
|     multi_type_tree( x0, y0, cbWidth, cbHeight / 4, | |
|       cqtDepth, mttDepth + 1, depthOffset, 0, treeType ) | |
|     multi_type_tree( x0, y1, cbWidth, cbHeight / 2, | |
|       cqtDepth, mttDepth + 1, depthOffset, 1, treeType ) | |
|     multi_type_tree( x0, y2, cbWidth, cbHeight / 4, | |
|       cqtDepth, mttDepth + 1, depthOffset, 2 , treeType ) | |
|     } | |
|   } else | |
|     coding_unit( x0, y0, cbWidth, cbHeight, treeType ) | |
| } | |

Coding Unit Syntax

| | Descriptor |
|---|---|
| coding_unit( x0, y0, cbWidth, cbHeight, treeType ) { | |
|   if( slice_type != I ) { | |
|     cu skip_flag[ x0 ] [ y0 ] | ae(v) |
|     if( cu skip_flag[ x0 ] [ y0 ] == 0 ) | |
|       pred_mode_flag | ae(v) |
|   } | |
|   if( CuPredMode[ x0 ][ y0 ] == MODE INTRA) { | |
|     if( pcm enabled flag && | |
|       cbWidth >= MinIpcmCbSizeY && cbWidth <= MaxIpcmCbSizeY | |
| && | |
|       cbHeight >= MinIpcmCbSizeY && cbHeight <= MaxIpcmCbSizeY ) | |

| | Descriptor |
|---|---|
|                   pcm_flag[ x0 ][ y0 ]<br>              if( pcm_flag[ x0 ][ y0 ] ) {<br>                while( !byte_aligned( ) )<br>                  pcm_alignment_zero_bit<br>                pcm_sample( cbWidth, cbHeight, treeType)<br>              } else {<br>                if( treeType == SINGLE_TREE \|\| treeType == DUAL_TREE_LUMA ) {<br>                  if( ( y0% CtbSizeY) > 0 )<br>                    intra_luma_ref_idx[ x0 ][ y0 ] | ae(v) |
|                   if (intra_luma_ref_idx[ x0 ][ y0 ] == 0)<br>                    intra_luma_mpm_flag[ x0 ][ y0 ] | ae(v) |
|                   if( intra_luma_mpm_flag[ x0 ][ y0 ] )<br>                    intra_luma_mpm_idx[ x0 ][ y0 ] | ae(v) |
|                   else<br>                    intra_luma_mpm_remainder[ x0 ][ y0 ] | ae(v) |
|               }<br>              if( treeType == SINGLE_TREE \|\| treeType == DUAL_TREE_CHROMA )<br>                intra_chroma_pred_mode[ x0 ][ y0 ] | ae(v) |
|             }<br>        } else { /* MODE_INTER */<br>            if( cu_skip_flag[ x0 ][ y0 ] ) {<br>              if( MaxNumSubblockMergeCand > 0 && cbWidth >= 8 && cbHeight >= 8 )<br>                merge_subblock_flag[ x0 ][ y0 ] | ae(v) |
|               if( merge_subblock_flag[ x0 ][ y0 ] == 0 && MaxNumMergeCand > 1 )<br>                merge_idx[ x0 ][ y0 ] | ae(v) |
|               if( merge_subblock_flag[ x0 ][ y0 ] == 1 && MaxNumSubblockMergeCand > 1)<br>                merge_subblock_idx[ x0 ][ y0 ] | ae(v) |
|             } else {<br>              merge_flag[ x0 ][ y0 ] | ae(v) |
|               if( merge_flag[ x0 ][ y0 ] ) {<br>                if( MaxNumSubblockMergeCand > 0 && cbWidth >= 8 && cbHeight >= 8 )<br>                  merge_subblock_flag[ x0 ][ y0 ] | ae(v) |
|                 if( merge_subblock_flag[ x0 ][ y0 ] == 0 && MaxNumMergeCand > 1 )<br>                  merge_idx[ x0 ][ y0 ] | ae(v) |
|                 if( merge_subblock_flag[ x0 ][ y0 ] == 1 && MaxNumSubblockMergeCand > 1 )<br>                  merge_subblock_idx[ x0 ][ y0 ] | ae(v) |
|             } else {<br>              if( slice_type == B )<br>                inter_pred_idc[ x0 ][ y0 ] | ae(v) |
|               if( sps_affine_enabled_flag && cbWidth >= 16 && cbHeight >= 16 ){<br>                inter_affine_flag[ x0 ] [ y0 ] | ae(v) |
|                 if( sps_affine_type_flag && inter_affine_flag[ x0 ][ y0 ] )<br>                  cu_affine_type_flag[ x0 ][ y0 ] | ae(v) |
|               }<br>              if( inter_pred_idc[ x0 ][ y0 ] != PRED_L1) {<br>                if( num_ref_idx_l0_active_minus1 > 0 )<br>                  ref_idx_l0[ x0 ][ y0 ] | ae(v) |
|                 mvd_coding( x0, y0, 0, 0 )<br>                if( MotionModelIdc[ x0 ][ y0 ] > 0 )<br>                  mvd_coding( x0, y0, 0, 1 )<br>                if( MotionModelIdc[ x0 ][ y0 ] > 1 )<br>                  mvd_coding( x0, y0, 0, 2 )<br>                mvp_l0_flag[ x0 ] [ y0 ] | ae(v) |
|               } else {<br>                MvdL0[ x0 ][ y0 ][ 0 ] = 0<br>                MvdL0[ x0 ][ y0 ][ 1 ] = 0<br>              }<br>              if( inter_pred_idc[ x0 ][ y0 ] != PRED_L0 ) {<br>                if( num_ref_idx_l1_active_minus1 > 0 )<br>                  ref_idx_l1[ x0 ][ y0 ] | ae(v) |
|                 if( mvd_l1_zero_flag && inter_pred_idc[ x0 ][ y0 ] == PRED_BI ) {<br>                  MvdL1[ x0 ][ y0 ][ 0 ] = 0<br>                  MvdL1[ x0 ][ y0 ][ 1 ] = 0<br>                  MvdCpL1[ x0 ] [y0 ][ 0 ][ 0 ] = 0<br>                  MvdCpL1[ x0 ][ y0 ][ 0 ][ 1 ] = 0<br>                  MvdCpL1[ x0 ][ y0 ][ 1 ][ 0 ] = 0<br>                  MvdCpL1[ x0 ][ y0 ][ 1 ][ 1 ] = 0 | |

-continued

| | Descriptor |
|---|---|
|             MvdCpL1[ x0 ][ y0 ][ 2 ][ 0 ] = 0 | |
|             MvdCpL1[ x0 ][ y0 ][ 2 ][ 1 ] = 0 | |
|          } else { | |
|             mvd_coding( x0, y0, 1, 0 ) | |
|             if( MotionModelIdc[ x0 ][ y0 ] > 0 ) | |
|               mvd_coding( x0, y0, 1, 1 ) | |
|             if(MotionModelIdc[ x0 ][ y0 ] > 1 ) | |
|               mvd_coding( x0, y0, 1, 2 ) | |
|             mvp_l1_flag[ x0 ][ y0 ] | ae(v) |
|         } else { | |
|            MvdL1[ x0 ][ y0 ][ 0 ] = 0 | |
|            MvdL1[ x0 ][ y0 ][ 1 ] = 0 | |
|         } | |
|         if( sps_amvr_enabled_flag && inter_affine_flag == 0 && | |
|           ( MvdL0[ x0 ][ y0 ][ 0 ] != 0 \|\| MvdL0[ x0 ][ y0 ][ 1 ] != 0 \|\| | |
|             MvdL1[ x0 ][ y0 ][ 0 ] != 0 \|\| MvdL1[ x0 ][ y0 ][ 1 ] != 0 ) ) | |
|           amvr_mode[ x0 ][ y0 ] | ae(v) |
|       } | |
|     } | |
|   } | |
|   if( !pcm_flag[ x0 ][ y0 ] ) { | |
|     if( CuPredMode[ x0 ][ y0 ] != MODE_INTRA && | |
| cu_skip_flag[ x0 ][ y0 ] == 0 ) | |
|       cu_cbf | ae(v) |
|     if( cu_cbf ) | |
|       transform_tree( x0, y0, cbWidth, cbHeight, treeType ) | |
|   } | |
| } | |

That is, in example embodiments, several neighboring blocks are first identified, two contexts are used for entropy coding the pred_mode_flag of the current block, when none of the identified neighboring blocks is coded by intra prediction mode, then the first context may be used, otherwise, the other context may be used.

Also, several neighboring blocks may be first identified, and two contexts may be used for entropy coding the pred_mode_flag of the current block. When none of the identified neighboring blocks is coded by an intra prediction mode or an intra-inter prediction mode, then the first context may be used, otherwise, the second context may be used.

In other examples, several neighboring blocks may be first identified, and two contexts may be used for entropy coding a CBF flag of the current block. When none of the identified neighboring blocks is coded by intra prediction mode, then the first context may be used, otherwise, a second context may be used.

In other examples, several neighboring blocks may be first identified, and two contexts may be used for entropy coding the CBF flag of the current block. When none of the identified neighboring blocks is coded by intra prediction mode or intra-inter prediction mode, then the first context may be used, otherwise, the second context may be used.

When entropy coding syntax elements such as a Skip flag (cu_skip_flag), an Affine flag (inter affine flag), a Sub-block merge flag (merge subblock flag), CU split flags (qt_split_cu_flag, mtt_split_cu_flag, mtt_split_cu_vertical_flag, mtt_split_cu_binary_flag,), IMV flag (amvr_mode), an Intra-inter mode flag, a Triangle partitioning flag, it is proposed to use two contexts depending on the corresponding flag values used for neighboring blocks according to the above-described embodiments. Examples of such flags are introduced in the above noted tables. Meanings for these flags may suggest different respective modes, such as one or another of skip modes, affine modes, subblock merge modes, etc.

Further, according to exemplary embodiments, several neighboring blocks are first identified. When entropy coding the aforementioned flags, when none of the identified neighboring blocks is coded by corresponding mode (meaning the associated flag value is signaled with a value indicating the corresponding mode is enabled), then a first context may be used, otherwise, the second context may be used. Additionally, any of the embodiments with respect to FIG. 10 and FIG. 11 may be used with these additional flags as would be understood by one of ordinary skill in the art in view of this disclosure.

As described above, according to exemplary embodiments, a context number may be advantageously reduced to only two contexts for a flag and such predictions.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for video encoding, the method comprising:
   determining whether at least one of a plurality of neighboring blocks in a video sequence is to be encoded by a mode;
   encoding a flag of a current block by a first context based on at least one of the plurality of neighboring blocks being coded by the mode and regardless of whether more than the at least one of the plurality of neighboring blocks being coded by the mode; and
   encoding the flag of the current block by a second context based on none of the plurality of neighboring blocks being coded by at least the mode,
   wherein the mode is one of an intra prediction mode, an inter prediction mode, and an intra-inter prediction mode.

2. The method according to claim 1,
wherein encoding the flag of the current block comprises encoding by only the first context and the second context.

3. The method according to claim 1, further comprising:
determining whether at least one of the plurality of neighboring blocks is coded by the intra-inter prediction mode;
encoding the flag of the current block by the first context based on at least one of the plurality of neighboring blocks being coded by the intra-inter prediction mode; and
encoding the flag of the current block by the second context based none of the plurality of neighboring blocks being coded by any of the intra prediction mode and the intra-inter prediction mode.

4. The method according to claim 1, further comprising:
encoding a skip flag of the current block by a first skip context based on at least one of the plurality of neighboring blocks being coded by the mode; and
encoding the skip flag of the current block by a second skip context based on none of the plurality of neighboring blocks being coded by at least the mode.

5. The method according to claim 1, further comprising:
encoding an affine flag of the current block by a first affine context based on at least one of the plurality of neighboring blocks being coded by the mode; and
encoding the affine flag of the current block by a second affine context based on none of the plurality of neighboring blocks being coded by at least the mode.

6. The method according to claim 1, further comprising:
encoding a sub-block merge flag of the current block by a first sub-block merge context based on at least one of the plurality of neighboring blocks being coded by the mode; and
encoding the sub-block merge flag of the current block by a second sub-block merge context based on none of the plurality of neighboring blocks being coded by at least the mode.

7. The method according to claim 1, further comprising:
encoding a coding unit (CU) split flag of the current block by a first CU split context based on at least one of the plurality of neighboring blocks being coded by the mode; and
encoding the CU split flag of the current block by a second CU split context based on none of the plurality of neighboring blocks being coded by at least the mode.

8. The method according to claim 1, further comprising:
encoding an adaptive motion vector resolution (AMVR) flag of the current block by a first AMVR context based at least one of the plurality of neighboring blocks being coded by the mode; and
encoding the AMVR flag of the current block by a second AMVR context based on none of the plurality of neighboring blocks being coded by at least the mode.

9. The method according to claim 1, further comprising:
encoding an intra-inter mode flag of the current block by a first intra-inter mode context based on at least one of the plurality of neighboring blocks being coded by the mode; and
encoding the intra-inter mode flag of the current block by a second intra-inter mode context based on none of the plurality of neighboring blocks being coded by at least the mode.

10. The method according to claim 1, further comprising:
encoding a triangle partitioning mode flag of the current block by a first triangle partitioning mode context based on at least one of the plurality of neighboring blocks being coded by the mode; and
encoding the triangle partitioning mode flag of the current block by a second triangle partitioning mode context based on none of the plurality of neighboring blocks being coded by at least the mode.

11. The method according to claim 1, further comprising:
encoding a coded block flag (CBF) of the current block by a first CBF context based on at least one of the plurality of neighboring blocks being coded by the mode; and
encoding the CBF of the current block by a second CBF context based on none of the plurality of neighboring blocks being coded by at least the mode.

12. An apparatus for video encoding, the apparatus comprising:
at least one memory configured to store computer program code; and
at least one processor configured to access the at least one memory and operate according to the computer program code, the computer program code comprising:
first determining code configured to cause the at least one processor to determine whether at least one of a plurality of neighboring blocks in a video sequence is to be encoded by a mode;
first performing code configured to cause the at least one processor to encode a flag of a current block by a first context based on at least one of the plurality of neighboring blocks being coded by the mode and regardless of whether more than the at least one of the plurality of neighboring blocks being coded by the mode; and
second performing code configured to cause the at least one processor to encode the flag of the current block by a second context based on none of the plurality of neighboring blocks being coded by at least the mode,
wherein the mode is one of an intra prediction mode, an inter prediction mode, and an intra-inter prediction mode.

13. The apparatus according to claim 12, wherein the first performing code is further configured to cause the processor to perform encoding, of the flag of the current block, by only the first context and the second context.

14. The apparatus according to claim 12, wherein the computer program code further comprises:
second determining code configured to cause the at least one processor to determine whether at least one of the plurality of neighboring blocks is coded by the intra-inter prediction mode;
third performing code configured to cause the at least one processor to encode the flag of the current block by the first context based on at least one of the plurality of neighboring blocks being coded by the intra-inter prediction mode; and
fourth performing code configured to cause the at least one processor to code the flag of the current block by the second context based on none of the plurality of neighboring blocks being coded by any of the intra prediction mode and the intra-inter prediction mode.

15. The apparatus according to claim 12, wherein the computer program code further comprises:
third performing code configured to cause the at least one processor to encode a skip flag of the current block by a first skip context based on at least one of the plurality of neighboring blocks being coded by the mode; and
fourth performing code configured to cause the at least one processor to encode the skip flag of the current block by a second skip context based on none of the plurality of neighboring blocks are coded by at least the mode.

16. The apparatus according to claim 12, further comprising:
third performing code configured to cause the at least one processor to encode an affine flag of the current block by a first affine context based on at least one of the plurality of neighboring blocks being coded by the mode; and
fourth performing code configured to cause the at least one processor to encode the affine flag of the current block by a second affine context based on none of the plurality of neighboring blocks being coded by at least the mode.

17. The apparatus according to claim 12, further comprising:
third performing code configured to cause the at least one processor to encode a sub-block merge flag of the current block by a first sub-block merge context based on at least one of the plurality of neighboring blocks being coded by the mode; and
fourth performing code configured to cause the at least one processor to code the sub-block merge flag of the current block by a second sub-block merge context based on none of the plurality of neighboring blocks being coded by at least the mode.

18. The apparatus according to claim 12, further comprising:
third performing code configured to cause the at least one processor to encode a coding unit (CU) split flag of the current block by a first CU split context based on at least one of the plurality of neighboring blocks being coded by the mode; and
fourth performing code configured to cause the at least one processor to encode the CU split flag of the current block by a second CU split context based on none of the plurality of neighboring blocks being coded by at least the mode.

19. The apparatus according to claim 12, further comprising:
third performing code configured to cause the at least one processor to encode an adaptive motion vector resolution (AMVR) flag of the current block by a first AMVR context based on at least one of the plurality of neighboring blocks being coded by the intra prediction mode; and
fourth performing code configured to cause the at least one processor to encode the AMVR flag of the current block by a second AMVR context based on none of the plurality of neighboring blocks being coded by at least the mode.

20. A method of processing visual media data, the method comprising:
performing a conversion between a visual media file and a bitstream of a visual media data according to a format rule,
wherein the bitstream includes a flag of a current block coded by a first context based on at least one of the plurality of neighboring blocks being coded by the mode and regardless of whether more than the at least one of the plurality of neighboring blocks being coded by the mode,
wherein the bitstream further includes the flag of the current block coded by a second context based on none of the plurality of neighboring blocks being coded by at least the mode, and
wherein the mode is one of an intra prediction mode, an inter prediction mode, and an intra-inter prediction mode.

* * * * *